United States Patent
Kogen et al.

(10) Patent No.: US 8,498,902 B1
(45) Date of Patent: Jul. 30, 2013

(54) PROCESS AND SYSTEM FOR THE CLEARING AND SETTLING OF TRANSACTIONS

(75) Inventors: Mark F. Kogen, Lawndale, CA (US); Ramiro M. Munoz, Santa Monica, CA (US)

(73) Assignee: Citicorp Development Center, Inc., Blue Ash, OH (US)

( * ) Notice: Subject to any disclaimer, the term of this patent is extended or adjusted under 35 U.S.C. 154(b) by 1826 days.

(21) Appl. No.: 09/558,569

(22) Filed: Apr. 26, 2000

Related U.S. Application Data

(60) Provisional application No. 60/131,387, filed on Apr. 28, 1999.

(51) Int. Cl.
*G06Q 20/00* (2006.01)
*G06Q 20/20* (2012.01)

(52) U.S. Cl.
CPC .................................. *G06Q 20/20* (2013.01)
USPC ............................... 705/17; 705/39; 705/40

(58) Field of Classification Search
USPC .................. 705/30, 39, 40, 36; 235/379, 380
See application file for complete search history.

(56) References Cited

U.S. PATENT DOCUMENTS

| | | | |
|---|---|---|---|
| 4,727,243 A | 2/1988 | Savar | 235/379 |
| 4,758,954 A | 7/1988 | Takiguchi | 364/401 |
| 5,072,380 A | 12/1991 | Randelman et al. | 364/406 |
| 5,450,051 A | 9/1995 | Stromberg | 235/384 |
| 5,633,930 A | 5/1997 | Davis et al. | 380/24 |
| 5,648,906 A | 7/1997 | Amirpanahi | 364/464.28 |
| 5,696,908 A | 12/1997 | Muehlberger et al. | 395/239 |
| 5,809,480 A | 9/1998 | Chasek | 705/13 |
| 5,974,146 A | 10/1999 | Randle et al. | 380/24 |
| 6,032,133 A * | 2/2000 | Hilt et al. | 705/40 |
| 6,032,135 A * | 2/2000 | Molano et al. | 705/39 |
| 6,052,672 A * | 4/2000 | Foster | 705/35 |
| 6,125,988 A * | 10/2000 | Waters | 194/217 |
| 6,145,740 A * | 11/2000 | Molano et al. | 235/380 |
| 6,304,860 B1 * | 10/2001 | Martin, Jr. et al. | 705/43 |
| 6,434,238 B1 * | 8/2002 | Chaum et al. | 235/380 |

FOREIGN PATENT DOCUMENTS

| | | |
|---|---|---|
| JP | 1250187 A | 10/1989 |
| JP | 4106690 A | 4/1992 |

OTHER PUBLICATIONS

"Tran$Cash Consortium Organized to Streamline Fare Collection," Dialog Telecom. Newsletters, vol. 10, Issue 21, Oct. 21, 1996.
Washburn, Brian, "Wireless Applications for Intelligent "Transportation" Systems," *Telecommunications*, v. 30, n. 7, p. 40(4), Jul. 1996.
Hack, David B., "Intelligent "Transportation" Infrastructure Goals Set," *Electronic News* (1991), v. 42, n. 2109, p. 30(2), Mar. 25, 1996.
Shellenberger, Rolfe R., "Pursuing Ticketless Air Travel," *Business and Travel News*, 1992, n. 241, 10, Sep. 28, 1992.
"Spanish Commuters to Try Contactless VISA Cash," Dialog Telecom. Newsletters, vol. 12, Issue 7, Apr. 12, 1999.

* cited by examiner

*Primary Examiner* — Marissa Thein
(74) *Attorney, Agent, or Firm* — Eric L. Sophir; Dentons US LLP

(57) ABSTRACT

A method and system for the clearing and settlement of funds among a plurality of participants facilitates the integration of a "closed" special purpose industry sector, such as the transit industry, within an open financial payment system. A method for clearing and settling funds among a plurality of participants comprises receiving data relating to transactions from the plurality of participants, organizing the data into groups associated with each of the plurality of participants, summing the data in the groups to determine a total funds due to and from each of the plurality of participants, and settling the difference among the plurality of participants by transferring funds to the participants owed funds and collecting funds from the participants who owe funds.

61 Claims, 10 Drawing Sheets

| Transactions | From/To | Funds Movement | Notes | Transit Operator 1 | Transit Operator 2 | Third-Party Merchant | TCS System Operator | Card Issuer |
|---|---|---|---|---|---|---|---|---|
| Fare Collection | From Transit Application | None | | | | | | |
| | From VISA Cash | TCS system operator receives funds from VISA and settles with Transit Operator | Separately, VISA settles with the VISA cash issuer. | Debit | | | Credit | |
| | Transfer | Applicable transfer amount as agreed between Transit Operators | | Credit | Debit | | | |
| | Distance Fare-failed tag | Collected by Transit Operator 2 for Transit Operator 1 | "Off us" | Credit | Debit | | | |
| Transit Load | Transit Operator J's products at its premises | Value applicable to load, after discounts to consumer | "On us" | Credit | | | Debit | |
| | Transit Operator J's products at Transit Operator 2 | Value applicable to load, after discounts to consumer | "Off us" | Credit | | | Debit | |
| | At Third-Party Location | Value applicable to load, after discounts to consumer | | Credit | | | Debit | |
| | Chargebacks for transit product loads | Amount charged back | Funds are ultimately due the consumer through the card issuer; this occurs outside the transit clearing process. | Debit | | | Credit | |
| Card Issuance | At CVMs | Refundable deposit | CVMs are revenue serviced by the TCS system operator | | | | Debit | Credit |
| | OTC at Transit Operator | Refundable deposit | | Debit | | | | Credit |
| | OTC at Third-Party Merchant | Refundable deposit | Revenue servicing will be performed by the TCS system operator | | | Debit | | Credit |
| | Refunds for lost/stolen or defective cards | Amount due the consumer as refund | The TCS system operator credits the card-holder separately outside the clearing process. | | | | Credit | Debit |
| | Chargebacks for card issuance | Amount charged back | Separately, the TCS system operator settles with the funding card issuer. | | | | Credit | Debit |
| TOTALS | | | | | | | | |

FIG. 7

PROCESS AND SYSTEM FOR THE CLEARING AND SETTLING OF TRANSACTIONS

CROSS-REFERENCE TO RELATED APPLICATION

This application claims priority to applicant's application having U.S. Ser. No. 60/131,387 and filed Apr. 28, 1999.

FIELD OF INVENTION

The present invention relates to a clearing and settlement system that facilitates the integration of a "closed" special purpose industry sector within an open financial payment system and to a process for the clearing and settling funds among a plurality of participants, including participants in a "closed" special purpose industry sector and participants from an open financial payment system. The present invention is particularly relevant to the transit industry.

BACKGROUND OF THE INVENTION

Companies in specialty business sectors often find it desirable to contract with other companies in their specialty business sector to offer a more complete service to the customers. Additionally, companies often find it advantageous to provide numerous ways for their customers to purchase their goods and services. Such specialty business sectors include, for example, any frequent use industry in which customers will realize a service advantage through the integration of alternate means of payment (e.g., an open financial payment system) within the industry and in which the industry will advantageously develop customer loyalty through the integration. The amusement park or theme park industry would benefit from such integration by allowing various parks (e.g., traditional theme parks, water parks, zoos) in close proximity to one another to negotiate agreements with each other to minimize the conventional inconvenience of customers wishing to visit multiple parks in a single day.

Another industry in which companies have benefited to some extent already by contracting with each other to reduce customer inconvenience is the transit industry. Major cities typically have a network or system of interconnected transportation routes or lines that are run by different companies. It is generally advantageous for a first company to have the flexibility to accept a ticket or fare from a second company. There are generally cross-agency contracts that define the allocation of inter-agency transfers. In traditional payment settlement, all funds collected are allocated back to a merchant less processor, interchange and issuer fees and adjustments. With respect regard to inter-agency transfers, on a subway for example, many transit operators currently process the transfers every few months in a manual fashion by weighing transfer tickets.

The terms "clear" and "clearing" are widely used in the financial services community to represent the activities performed at the end of each agreed period (usually a day or a fraction of day) by a central organization to determine the funds due to each participant in a payment system. The terms "settle" and "settlement" are used to describe the processes involved in sending payments, at the end of the period, to the individual participants as a result of the clearing process.

Clearing and settling the funds associated with daily transit transactions, especially inter-agency transactions, can be difficult and time-consuming. Thus, there is a need for a more efficient and cost-effective mechanism for clearing and settling funds among a number of participants in specialty business sectors.

There is also a need for additional, more convenient ways for customers in specialty business sectors to purchase goods and services that may be fully integrated within the business sector. In particular, there is a need for a clearing and settlement system that facilitates the integration of a "closed" special purpose industry sector within an open financial payment system.

SUMMARY OF THE INVENTION

The present invention relates to a method and system for clearing and settlement of funds that facilitates the integration of a "closed" special purpose industry sector within an open financial payment system. Additionally, the method and system of the present invention segregates funds allocation rules unique to that sector from generic operations. For example, in the transit industry, there are cross-agency contracts that define the allocation of inter-agency transfers. Apportionment of those funds is split cross-agency even though they are collected by a specific merchant (agency). This is just one example, as transit collections may include a variety of transactions including zero value exchanges, such as in the case of the use of a pass which needs to be documented but for which no funds are received. This differs from traditional payment settlement, which allocates back to a merchant all funds collected less processor, interchange and issuer fees and adjustments.

Although described herein with reference to a transit application, as one skilled in the art will realize, the present invention can be applied to any specialty business sector, not just the transit industry. The present invention can be applied to any frequent use industry in which customers will realize a service advantage through the integration of an open financial payment system within the industry and in which the industry will advantageously develop customer loyalty through the integration. Another industry in which the present invention may advantageously be implemented is the amusement park or theme park industry.

In the transit example, the various participants (transit operators, third-party distributors, card issuers, and the transit clearing and settlement (TCS) system operator) in the TCS or transit fare payment system perform transactions with cardholders during the course of each day, which must be collected, summarized, and reported at the end of the day. Some, but not all, of these transactions involve the movement of funds among participants and the outside financial services community, reflecting their financial impact. Using the data collected daily for these transactions, and rules encoded into its software processes, the TCS system apportions funds due, if any, to and from the participants involved in each transaction, then calculates the totals due to and from each participant and arrives at a net position for each. The final step is a movement of funds to the participants owed funds by the system and the collection of funds from those participants who owe funds to the system.

In one embodiment, the present invention relates to a method for clearing and settling funds among a plurality of participants comprising receiving data relating to transactions from the plurality of participants, organizing the data into groups associated with each of the plurality of participants, summing the data in the groups to determine a total funds due to and from each of the plurality of participants, and settling the difference among the plurality of participants by transferring funds to the participants owed funds and collecting funds from the participants who owe funds. The data are preferably received, organized and summed on a daily basis on a first day after a day on which the transactions occurred. The settling of the difference among the participants is preferably performed on a second banking day after a day on which the transactions occurred.

A further embodiment of the present invention comprises interfacing with an open purse settlement system, such as VISA Cash. The data relating to transactions received in this embodiment are preferably obtained from an interaction between an electronic purse and a card interface device. The data from the interaction between the electronic purse and the card interface device are preferably received from a data server. To settle the difference by transferring funds to the participants owed funds and collecting funds from the participants who owe funds based on an interaction between an electronic purse and a card interface device, data relating to the transaction are preferably sent to a financial services institution responsible for the open purse settlement system, such as VISA or MasterCard. In addition, to settle the difference, funds may be received from the financial services institution's clearing and administration system. The funds received from the financial services institution's clearing and administration system may then be credited to at least one of the participants owed funds.

In a further embodiment of the present invention, the settlement of the difference among the plurality of participants comprises transferring funds to the participants owed funds and collecting funds from the participants who owe funds on a net settlement basis. Although settling the difference on a net settlement basis is preferred, the difference may alternatively be settled on a gross settlement basis. In another embodiment, settling the difference comprises guaranteeing the settlement of obligations of at least one third party merchant. For example, a clearing and settlement system operator may bear the credit risk for third-party merchants and, thus, guarantee the payment obligation of a third party merchant to the system. The settlement of obligations of at least one third-party merchant may be guaranteed by issuing a line of credit to the at least one third party merchant. In another embodiment, the settlement may be guaranteed by depositing collateral in an account.

According to an embodiment of the present invention, the transfer of funds to the participants owed funds may comprise crediting funds to the participants owed funds through an automated clearinghouse. The collection of funds from the participants who owe obtained funds through cash-based card issuance or cash-based card loads may comprise receiving payments from the participants who owe funds through a revenue servicing agent. In this embodiment, the participants may include at least one transit operator and at least one third party merchant.

An embodiment of a process of the present invention may further comprise reconciling the total funds due to and from each of the plurality of participants. The reconciliation of the total funds due, in one embodiment, may comprise comparing the total funds due to and from each of the plurality of participants with data relating to transaction totals based on the data relating to transactions received from the plurality of participants.

An embodiment of a process of the present invention may further comprise providing a report to each of the plurality of participants detailing the transactions and the funds transferred and collected from the participants. The reports may include fare collection details sorted by transit card and fare collection details from at least one open purse system. The reports may additionally include data relating to transfers, the loading of transit cards and chargebacks.

As noted above, the present invention may be advantageously implemented in the transit industry. The transit industry includes, for example, airlines, trains, subways, taxi services, limousines and other forms of transportation. In an embodiment of the present invention, the plurality of participants may comprise at least one transit operator, at least one card issuer, at least one third party merchant, at least one open purse settlement system or any combination thereof.

In a further embodiment of a process of the present invention, the participants include at least one transit operator and receipt of data relating to transactions comprises receiving data relating to at least one fare collection transaction. The data relating to the at least one fare transaction may be obtained, in one embodiment, from an interaction between a transit card and a card interface device. The interaction between a transit card and a card interface device that triggers the funds clearing process (e.g., receiving data relating to transactions from the plurality of participants), in one embodiment, is the purchase of a fare (e.g., the loading of a fare onto a transit card). Alternatively, the data relating to transactions may be received when a fare on the transit card is used. In one embodiment, the transit card is issued and the card interface device is owned by the first transit operator. Alternatively, the transit card may be issued by a first transit operator while the card interface device is owned by a second transit operator. The participants may further comprise an electronic purse system.

In another embodiment, the participants comprise at least one electronic purse system and the receipt of data relating to transactions may further comprise receiving data obtained from an interaction between an electronic purse and a card interface device. In a further embodiment, the data obtained from an interaction between an electronic purse and a card interface device is received from a transit data server. In a still further embodiment, the settlement of the difference among participants may comprise sending data relating to at least one transit card loading transaction to a financial services institution, such as VISA or MasterCard. For example, this data may relate to the use of an electronic purse to purchase a fare. Additionally, settling the difference by transferring funds to the participants owed funds may include receiving funds from the financial services institution's clearing and administration system. The funds received from the financial services institution's clearing and administration system may be credited to a transit operator.

In another embodiment of a method for clearing and settling funds among a plurality of participants, the participants comprise at least one transit operator and receiving data relating to transactions comprise receiving data relating to at least one loading of a transit card. The loading of a transit card comprises, for example, adding value to a transit card. In one embodiment, the transit card is loaded at an add value machine owned by a first transit operator while the transit card was issued by a second transit operator. When the transit card is loaded at an add value machine, receiving data relating to at least one loading of a transit card further comprises receiving data from the add value machine relating to at least one loading of a transit card. In another embodiment, the transit card is loaded at an electronic purse load machine. When a transit card is loaded at an electronic purse load machine, receiving data relating to at least one loading of a transit card further comprises receiving data from the electronic purse load machine relating to at least one loading of a transit card.

In another embodiment of a method for clearing and settling funds among a plurality of participants, the participants comprise at least one transit operator and receiving data relating to transactions comprises receiving data relating to at least one issuance of a transit card. In one embodiment, the issuance of a transit card requires payment of a refundable deposit to a card issuer. In further embodiment, the refundable deposit is payable by debit card, by credit card, by check, by cash or by electronic cash. The transit operators may sell transit cards and collect refundable deposits using a card vending machine. When the transit operators use a card vending machine, receiving data relating to at least one issuance of a transit card, in one embodiment, comprises receiving data from the card vending machine relating to the payment of the refundable deposit. In a further embodiment, receiving data from a card vending machine relating to the payment of the refundable deposit may include receiving data from the card vending machine relating to the payment of the refundable deposit upon issuance of the card when the refundable deposit is paid by debit card or credit card. When the refundable deposit is paid by check or by cash to the at least one transit operator, an embodiment of a method of the present invention further comprises collecting the refundable deposit using a revenue-servicing agent when the refundable deposit is paid by check or by cash to the at least one transit operator.

In an embodiment of the present invention implemented in a fare-by-distance or a fare-by-zone transit program, the present invention can preferably handle failed "tag off" transactions. This embodiment comprises ensuring that a transit rider has sufficient value on a transit card for a ride, deducting from the transit card a value representing a shortest available ride and setting an indicator on the transit card that a tag-off and remaining amount of funds are required. In a preferred embodiment, the transit card is a card and the ensuring, deducting and setting are performed by a card interface device. An embodiment of the present invention further comprises deducting value from the transit card when the rider fails to properly tag off. In one embodiment, the value is deducted from the transit card when the rider next attempts to use the transit card. A further embodiment comprises logging the transaction for later processing and continuing with the current fare payment normally.

Another embodiment of a method of the present invention comprises processing refunds to qualifying customers. Qualifying customers include customers whose cards were lost, stolen or defective. Refunds require payment by check or by credit to the consumer's debit or credit card. In a preferred embodiment, refund request transactions are processed and input into the clearing and settlement system by back office personnel.

A further embodiment of a method of the present invention comprising handling failed card load transactions. These transactions result from a dispute from a debit or credit card holder—for example, because of a failed load. They are received from the issuer of the card the cardholder used to fund the refundable deposit for the card issuance or the loading of products onto the card. In the former case, the card issuance transaction preferably is reversed, and the card issuer is charged for the funds. In the latter case, the operator preferably is charged for the amount loaded onto the card. These transactions are processed and input to the clearing and settlement system preferably by the system back office personnel.

Another embodiment of the present invention relates to method for clearing and settling funds among a plurality of participants comprising receiving data relating to transactions from the plurality of participants, apportioning funds due to and from each of the plurality of participants based on the transaction data, and settling the difference by transferring funds to the participants owed funds and collecting funds from the participants who owe funds. In an embodiment of the present invention, the plurality of participants may comprise at least one transit operator, at least one card issuer, at least one third party merchant, at least one open purse settlement system or any combination thereof.

The participants may further comprise an electronic purse system. In an embodiment with at least one transit operator and with at least one electronic purse system as participants, the receipt of data relating to at least one fare collection transaction comprises receiving data obtained from an interaction between an electronic purse and a card interface device. In a further embodiment, the data obtained from an interaction between an electronic purse and a card interface device is received from a data server. In a still further embodiment, the settlement of the difference among participants may comprise sending data relating to at least one fare collection transaction to a financial services institution, such as VISA or MasterCard. For example, this data may relate to the use of an electronic purse to purchase a fare. Additionally, settling the difference by transferring funds to the participants owed funds may include receiving funds from the financial services institution's clearing and administration system. The funds received from the financial services institution's clearing and administration system may be credited to a transit operator.

An embodiment of a method of the present invention may further comprise reconciling the total funds due to and from each of the plurality of participants. An embodiment of a process of the present invention may further comprise providing a report to each of the plurality of participants detailing the transactions and the funds transferred and collected from the participants.

In another embodiment of the method of present invention, the participants comprise at least one transit operator and receiving data relating to transactions comprises receiving data relating to at least one fare collection transaction. In a further embodiment, receiving data relating to transactions comprises receiving data relating to at least one loading of a transit card. In a still further embodiment, receiving data relating to transactions comprises receiving data relating to at least one issuance of a transit card.

The present invention also relates to a system for clearing and settling funds among a plurality of participants comprising means for receiving data relating to transactions from the plurality of participants, means for organizing the data into groups associated with each of the plurality of participants, means for summing the data in the groups to determine a total funds due to and from each of the plurality of participants, and means for settling the difference among the plurality of participants by transferring funds to the participants owed funds and collecting funds from the participants who owe funds.

A system of the present invention may further comprise means for interfacing with an open purse settlement system. Another embodiment of the system of the present invention comprises means for reconciling the total funds due to and from each of the plurality of participants. In a further embodiment, the means for reconciling the total funds due to and from each of the plurality of participants comprises means for comparing the total funds due to and from each of the plurality of participants agree with data relating to transaction totals based on the data relating to transactions received from the plurality of participants.

The system, in another embodiment may comprise means for providing a report to each of the plurality of participants detailing the transactions and the funds transferred and collected from the participants. In an embodiment of the present invention for the transit industry, the reports may include fare collection details sorted by transit card and fare collection details from at least one open purse system. The reports may further include data relating to transfers, the loading of transit cards and chargebacks.

In another embodiment of the present invention, the participants comprise at least one transit operator and the means for receiving data relating to transactions comprises means for receiving data relating to at least one fare collection transaction. In another embodiment, the participants further comprise an electronic purse system. The means for receiving data relating to at least one fare collection transaction, in an embodiment utilizing an electronic purse system, comprise means for receiving data obtained from an interaction between an electronic purse and a card interface device. In a further embodiment, the means for receiving data obtained from an interaction between an electronic purse and a card interface device comprise means for receiving data from a transit data server.

In another embodiment having an electronic purse system as a participant, the means for settling the difference by transferring funds to the participants owed funds and collecting funds from the participants who owe funds comprise means for sending data relating to at least one fare collection transaction to a financial services institution. The means for settling the difference by transferring funds to the participants owed funds and collecting funds from the participants who owe funds may also comprise means for receiving funds from the financial services institution's clearing and administration system. In a further embodiment, the means for settling the difference include means for crediting the funds received from the financial services institution to a transit operator.

In another embodiment of the system of the present invention, the participants comprise at least one transit operator and the means for receiving data relating to transactions comprise means for receiving data relating to at least one loading of a transit card. In a further embodiment, the transit card is loaded at an add value machine owned by a first transit operator and the transit card was issued by a second transit operator. In another embodiment, the transit card is loaded at an electronic purse load machine.

In another embodiment of the system of the present invention, the participants comprise at least one transit operator and the means for receiving data relating to transactions comprises means for receiving data relating to at least one issuance of a transit card. In a further embodiment, the issuance of a transit card requires payment of a refundable deposit to a card issuer. The refundable deposit may be payable by debit card, by credit card, by check, by cash or by electronic cash. In a still further embodiment, the at least one transit operator sells transit cards and collects refundable deposits using a card vending machine. In an embodiment where the refundable deposit is paid by check or by cash to the at least one transit operator, a system of the present invention further comprises means for collecting the refundable deposit using a revenue-servicing agent.

The present invention advantageously facilitates the integration of a "closed" special purpose industry sector within an open financial payment system.

Another advantage in the present invention's integration of the industry sector within an open financial payment system is the increased purchasing flexibility provided to the industry's customers.

A further advantage of the present invention is that it allows for the apportionment of funds to be split cross-agency and, thus, simplifies the clearing and settlement process in a multi-operator environment.

Further advantages of the present invention are that the financial risks of non-settlement by participants are significantly reduced and that the need for monitoring and control mechanisms to guarantee settlement are obviated by the clearing and settlement system operator acting as a merchant acquirer and interface to an established and trusted open purse settlement system.

A still further advantage of the present invention is that the processing of inter-operator transfers in a transit system is conducted automatically on a daily basis.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 7 is a table representation of the process that a transit clearing and settlement system of the present invention uses to arrive at a matrix of the participants' net settlement positions.

DETAILED DESCRIPTION OF THE INVENTION

The present invention is a method and system for the clearing and settlement of funds among a plurality of participants that facilitates the integration of a "closed" special purpose industry sector and an open financial payment system. Additionally, the present invention segregates funds allocation rules unique to that sector from generic operations. The plurality of participants in the method and system of the present invention might include industry operators, third-party merchants, card issuers and the clearing and settlement system operator.

The present invention is preferably implemented in an industry where the various participants perform transactions with cardholders during the course of each day, which must be collected, summarized, and reported at the end of the day. Some, but not all, of these transactions involve movement of funds among participants and the outside financial services community reflecting their financial impact. Using the data collected daily for these transactions, and rules encoded into its software processes, the clearing and settlement system apportions funds due, if any, to and from the participants involved in each transaction, then calculates the totals due to and from each participant and arrives at a net position for each. The final step is a movement of funds to the participants owed funds by the system and the collection of funds from those participants who owe funds to the system. In the transit industry, industry operators comprise transit operators, such as subway system, airlines, trains, buses and taxi companies. Third party merchants comprise non-transit operator distributors of transit products, such as a convenience store located next to a subway station.

Although described herein with reference to a transit application, as one skilled in the art will realize, the present invention can be applied to any specialty business sector, not just the transit industry. The present invention can be applied to any frequent use industry in which customers will realize a service advantage through the integration of an open financial payment system within the industry and in which the industry will advantageously develop customer loyalty through the integration. Another industry in which the present invention may advantageously be implemented is the amusement park or theme park industry.

Figure 1:
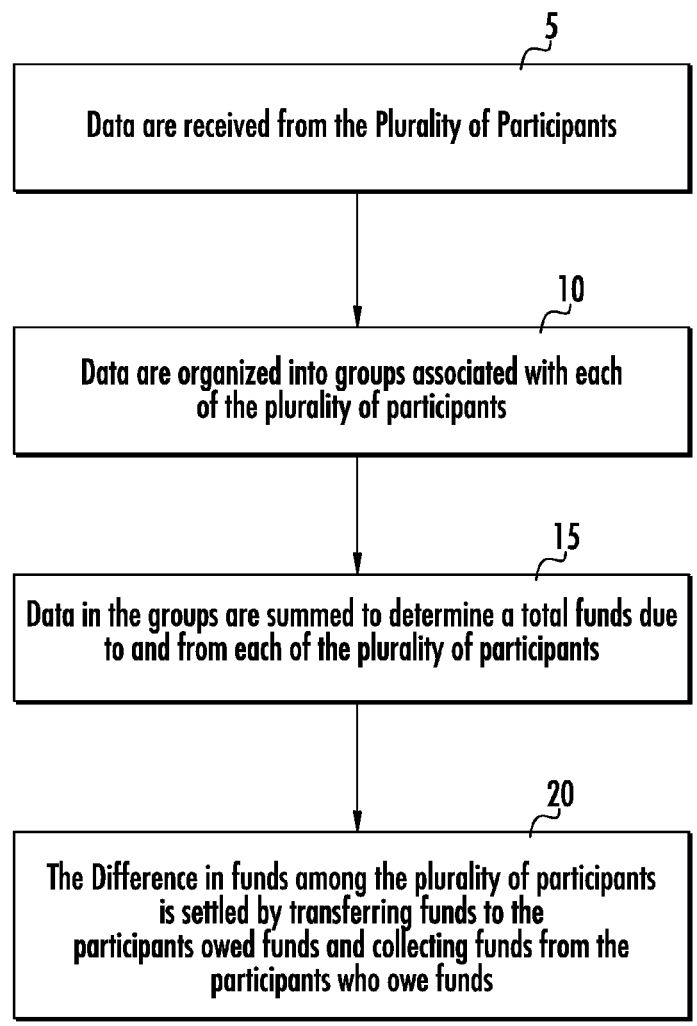
FIG. 1 is a flow chart which illustrates an embodiment of a method of the present invention for clearing and settling funds among a plurality of participants.

FIG. 1 is a flow chart which illustrates an embodiment of a method of the present invention for clearing and settling funds among a plurality of participants. In the embodiment shown, data relating to transactions are received from the plurality of participants 5, data are organized into groups associated with each of the plurality of participants 10, data in the groups are summed to determine a total funds due to and from each of the plurality of participants 15, and the difference in funds among the plurality of participants is settled by transferring funds to the participants owed funds and collecting funds from the participants who owe funds 20.

The clearing process, which involves the receipt of transaction data 5, the organization of data into groups 10, and the summation of the data in the groups 15, is preferably performed daily, seven times a week. All data received from the previous day's cut off until the cut-off for the current processing day is used in the process. For example, the daily cut-off time may be midnight.

The financial settlement (i.e., crediting of funds to participants' accounts) occurs on banking days (i.e., days on which banks are open for business). Settlement is made through a clearing and settlement system operator's Automated Clearinghouse (ACH), with funds credited to participants' accounts on the second banking day after the day on which the daily transactions occurred. For example, on Mondays, participants will receive credits resulting from their net settlement positions for the transactions on the previous Thursday.

A clearing and settlement system can operate on either a "net settlement" basis or a "gross settlement" basis. In a net settlement system, funds are moved in bulk representing the summary of daily activity for each participant. In a gross settlement system, the funds due to participants are sent individually, transaction by transaction, normally in real-time fashion as they occur. The net settlement model is preferred for the present invention, since it enables the industry operators to reconcile funds received at the summary level, and relieves the industry operators from the task of performing reconcilement at the transaction level, thereby reducing their operating costs.

Figure 2:
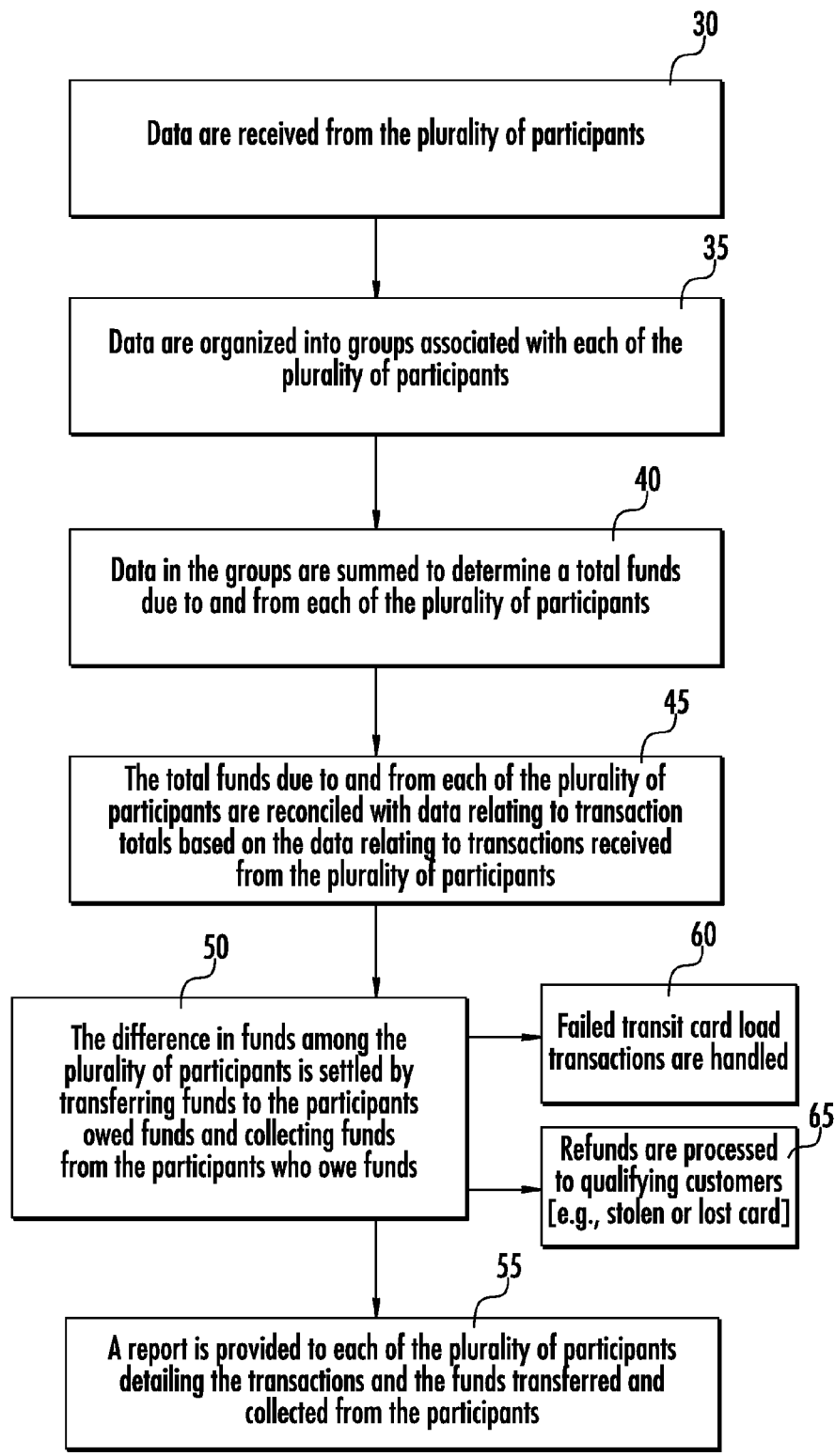
FIG. 2 is a flow chart which illustrates another embodiment of a method of the present invention for clearing and settling funds among a plurality of participants.

FIG. 2 is a flow chart which illustrates another embodiment of a method of the present invention for clearing and settling funds among a plurality of participants. As noted above, the plurality of participants in the present invention may comprise industry operators, third-party merchants, card issuers and the clearing and settlement system operator. In the method shown in FIG. 2, data relating to transactions are received from the plurality of participants 30, the data are organized into groups associated with each of the plurality of participants 35, and data in the groups are summed to determine a total funds due to and from each of the plurality of participants 40.

The total funds due to and from each of the plurality of participants are reconciled 45 with data relating to transaction totals based on the data relating to transactions from the plurality of participants. The reconcilement process is performed to ensure that all system balances agree with the transaction totals and that the transaction summaries for each industry operator (e.g., transit operator) equal the total of all transaction activity for the clearing period. Additional reconcilement processes may be required to manage the revenue collection process and the funds due from third party merchants or distributors. Once reconciled, the summaries result in a daily net debit/credit settlement position due to each industry operator. Preferably, this portion of the process takes place the day after the transactions occur and the output is a file that is transmitted to the clearing and settlement system operator for submission to its automated clearinghouse (ACH).

The difference in funds among the plurality of participants is settled 50 by transferring funds to the participants owed funds and collecting funds from the participants owed funds. The clearing and settlement system operator performs the settlement between the clearing and settlement system and the outside financial service community, including the crediting of funds to the industry operators through the ACH system. In the transit industry, this preferably involves end-of-day (EOD) payments to transit operators representing their net credit settlement due for daily processing activity. Similarly, the transit clearing and settlement (TCS) system operator may use a revenue servicing agent to collect funds from participants who owe funds, such as, for example, transit operators or third party merchants who owe funds from cash-based card issuance transactions or cash-based card load transactions.

The TCS system preferably manages the end of business day timeframes to ensure sufficient processing time for the ACH settlement process to take place in the earliest processing window, providing adequate time for any "remake capabilities" (re-transmit information in case of errors) necessary in the ACH settlement process. Potential TCS system operators include banks, which are preferably high volume processors of ACH transactions. A bank as a TCS system operator preferably has the capability to initiate ACH data and transactions in all National Automated Clearinghouse Association (NACHA)-approved formats.

Referring again to the embodiment shown in FIG. 2, a report is provided to each of the plurality of participants 55 detailing the transactions and the funds transferred and collected from the participants. In the transit industry, details of the transactions occurring each day in the TCS system or Fare Payment System preferably are provided in reports to all participants. These reports include details and summaries of the financial activities, statistical summaries, and other management reports, including fare collection details by transit product, fare collection from open purse systems, such as VISA Cash, transfers, loads by product type and location, and chargebacks. These reports preferably reconcile to the settlement totals.

The method of the present invention also preferably allows for the processing of refunds to qualifying customers 65. In one embodiment, qualifying customers include customers whose cards were lost, stolen or defective. Cards that qualify for a refund require payment via check or via credit to the consumer's debit or credit card. In the transit industry, the consumer receives the refundable deposit, kept in a pool account by the card issuer, plus the applicable unused portion of transit products on the card, which were originally received by the Transit Operator when the transit products were loaded. These transactions are processed and input to the TCS system preferably by back office personnel.

In a preferred embodiment of the present invention, failed card load transactions are handled 60. In the transit industry example, these transactions result from a dispute from a debit or credit card holder—for example, because of a failed load. They are received from the issuer of the card the cardholder used to fund a refundable deposit for the transit card issuance or the loading of transit products onto the transit card. In the former case, the transit card issuance transaction preferably is reversed, and the transit card issuer is charged for the funds. In the latter case, the transit operator preferably is charged for the amount loaded onto the card. These transactions are processed and input to the TCS system preferably by the TCS back office personnel.

Figure 3:
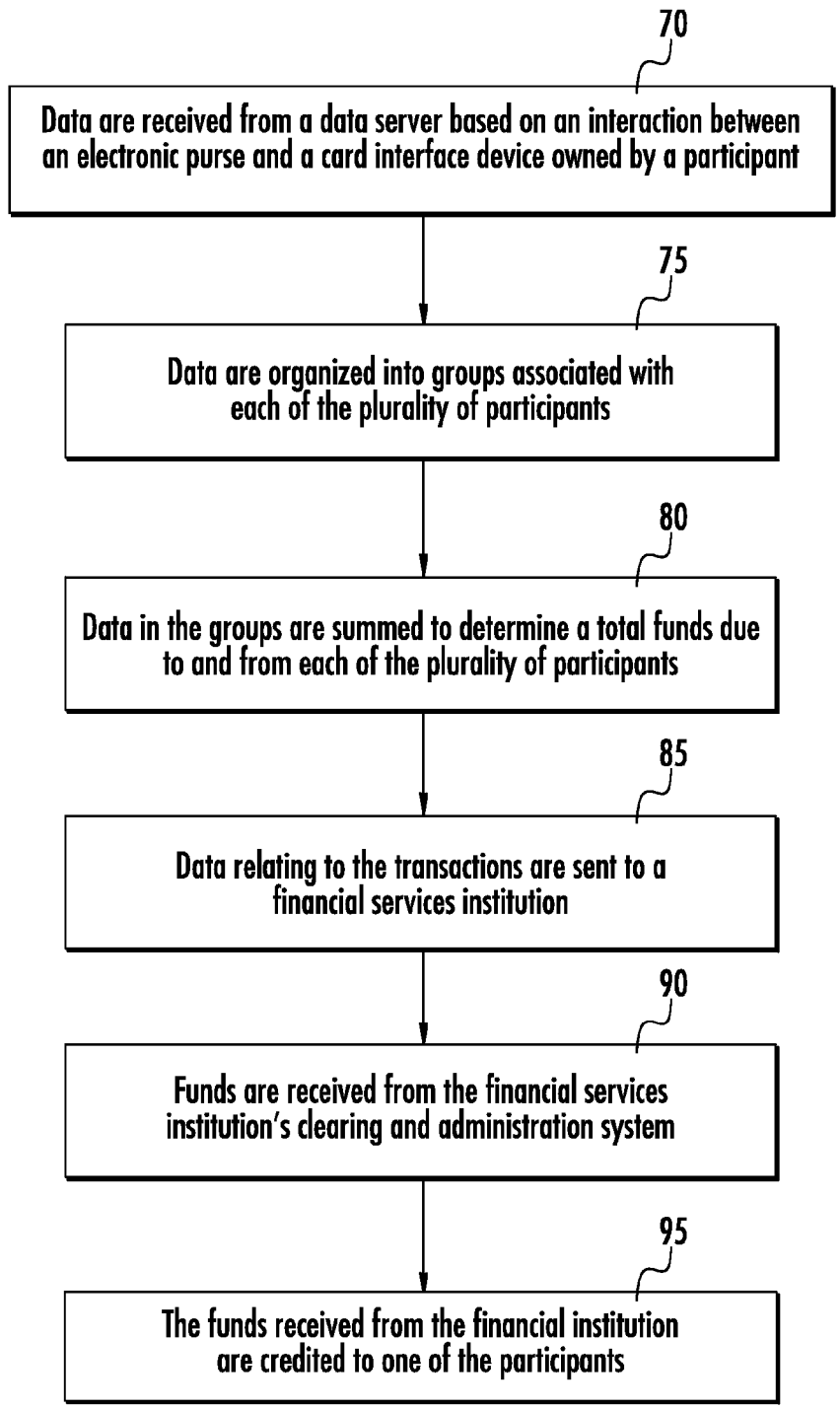
FIG. 3 is a flow chart which illustrates another embodiment of a method of the present invention for clearing and settling funds among a plurality of participants which involves interfacing with an open purse settlement system.

FIG. 3 is a flow chart which illustrates another embodiment of a method of the present invention for clearing and settling funds among a plurality of participants which involves interfacing with an open purse settlement system. Examples of open purse settlement systems include VISA Cash, Proton and other systems utilizing electronic purses.

In a typical open purse settlement system, an electronic purse issuer, such as a bank, issues a card that holds the electronic purse. The electronic purse holds electronic cash, such as VISA Cash, associated with a financial services institution, such as VISA. A cardholder can insert the card into an electronic purse loading machine and transfer funds from a bank account to add value (e.g., VISA cash) to the chip on the card. When value is added to the electronic purse, the electronic purse issuer (e.g., the bank) moves funds from the relevant cardholder's account to a funds pool account. When the cardholder makes a purchase with electronic cash, the purchase value is deducted from the electronic purse and the electronic cash associated with the card is stored in the merchant's electronic purse transaction device until the merchant collects the funds corresponding to the purchases with electronic cash. When the merchant wants to collect, all of the electronic cash purchase transactions are routed to the financial services institution (e.g., VISA), which then requests reimbursement from the electronic purse issuer (e.g., the bank). The issuer then transfers funds from the funds pool account to the financial services institution. The financial services institution then transfers the funds to the merchant or a merchant acquirer through its clearing and administration system.

The embodiment of the method of the present invention shown in FIG. 3 arises when a user purchases a product using an electronic purse. For example, in the transit industry, a transit rider may purchase a fare using an electronic purse. The electronic purse is preferably inserted into a card interface device to purchase the fare. Data relating to transactions involving the purchases with electronic purses are captured by the card interface devices and are received 70 by the clearing and settlement system through data servers. The data server systems are communications concentrators, used to connect a cluster of card interface devices to the central system. The data are organized 75 into groups associated with each of the plurality of participants and are summed 80 to determine a total funds due to and from each of the plurality of participants 15.

To settle the difference by transferring funds to the participants owed funds and collecting funds from the participants who owe funds, the clearing and settlement system needs to collect funds corresponding to electronic purse transactions. In a preferred embodiment, data relating to the transactions are sent 85 to a financial services institution, such as VISA or MasterCard. The financial services institution may then contact the issuer of the electronic purse for payment of funds corresponding to the electronic cash. Funds are then received 90 from the financial service institution's clearing and administration system. The clearing and settlement system operator credits 95 the funds to the account of a participant who is owed funds.

Figure 4:
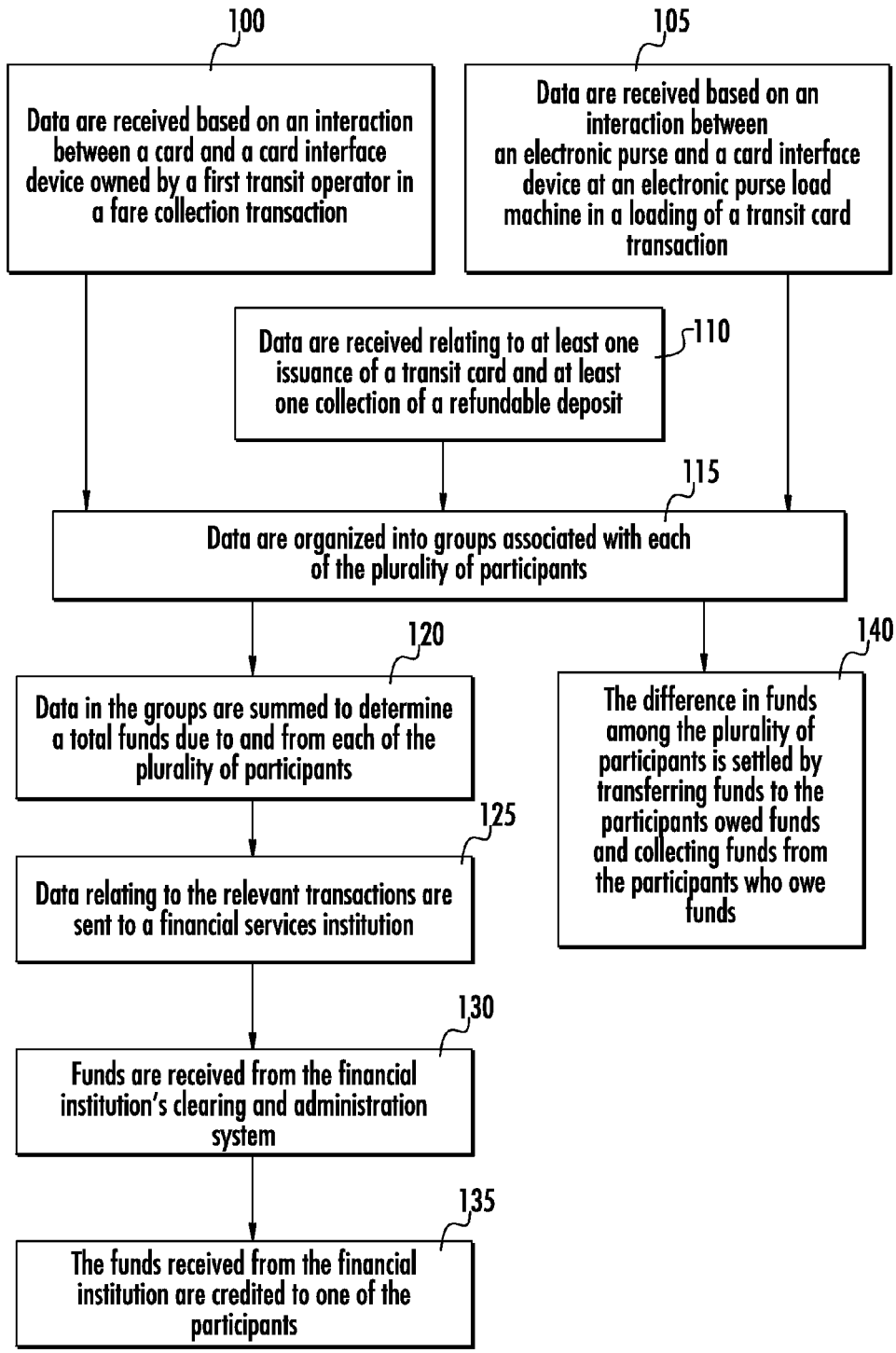
FIG. 4 is a flow chart which illustrates another embodiment of a method of the present invention for clearing and settling funds among a plurality of participants in a transit application.

FIG. 4 is a flow chart which illustrates another embodiment of a method of the present invention for clearing and settling funds among a plurality of participants in a transit application. When implemented in the transit industry, the plurality of participants may comprise at least one transit operator, at least one card issuer, at least one third party merchant and at least one transit clearing and settlement (TCS) system operator, although one TCS system operator is preferred. The rules encoded into the TCS system are based on the nature of the various transactions.

There are a variety of categories of transactions in the transit industry for which the method and system of the present invention may be utilized based on: the number of participants, the financial impact of a transaction, and the method used to collect details of the transaction. Each transaction involves at least one participant. Some transactions have financial impact, but not all. For example, pass validation transactions have no financial impact. Data collected for transactions may be transmitted on-line as it occurs to the TCS system, transmitted off-line in batch mode at the end of the day, or input manually by personnel involved in the back office operations of the TCS system operator.

In general, transit operators are net receivers of funds, third-party distributors are net payers of funds, and card issuers (in a multi-issuer environment) are net payers of funds. The TCS system operator, such as a bank, in its role as the merchant acquirer in the system, bears the credit risk for third-party merchants, and has the responsibility to guarantee the settlement of their obligations to the system, either through lines of credit or through collateral deposited at an account designated by the TCS system operator.

In a closed-purse multi-issuer environment, a guarantee mechanism is established whereby all transit card issuers establish bilateral or multilateral agreements, or pledge funds into an escrow account at a financial institution designated by the TCS system operator and/or transit operators, to guarantee settlement of their obligations to the system. In an open-purse environment, the transit system operator acts as a merchant acquirer and interface to an established and trusted open-purse settlement system, thereby significantly reducing the financial risks of non-settlement by participants, and obviating the need for monitoring and control mechanisms to guarantee settlement. The present invention preferably fully incorporates an open purse settlement system, VISA Cash, for example, into the fare payment process to accomplish this latter objective.

As shown in FIG. 4 and while not limiting the present invention to the transactions shown in FIG. 4, data relating to various transactions are received 100, 105, 110 from the plurality of participants. In one embodiment, the participants comprise at least one transit operator and data are received based on an interaction between a card and a card interface device owned by a first transit operator in a fare collection transaction 100. The card may be a transit card or a card carrying an electronic purse. Each instance of a transit card interaction with a card interface device (CID) is a fare collection transaction. A card that carries a transit operator's transit product, as presented to that operator's CID, will generally result in no financial settlement, as the fare was prepaid via the load process. The transaction is captured and used for subsequent analysis and reporting. For transaction tally purposes, the exit tag for zone- or distance-based fare scenarios (see discussion below for further explanation) are excluded from the total to prevent double counting.

When a transit card is used for a transfer from one transit operator to another, the purchase and redemption of an inter-operator transfer may be cleared in more than one fashion. In a transfer, a transit card is typically issued by a first transit operator and the card interface device is typically issued by a second transit operator. One scenario results in the funds clearing triggered by the "purchase" of the transfer at the point of purchase, with no clearing associated with it at the point of use. This scenario guarantees payment to the intended "receiving" transit operator, whether or not the transfer is ever redeemed.

Another scenario is the exact opposite, processing based on the point of use. The "receiving" transit operator's CID processes the transfer based on inter-operator rules. The transfer transaction is processed as a separate class of transaction during the end-of-day clearing. Transfers, whether they have settlement implications or not, are included in transaction count tallies and included in the TCS system processing fees charged to the transit operators.

As noted above, the receipt of data based on an interaction between a card and a card interface device in a fare collection transaction 100 shown in FIG. 4 may further comprise an electronic purse system as a participant where the card carries an electronic purse and the interaction is between the electronic purse and the card interface device. Data relating to a fare collection transaction based on the interaction between the electronic purse and the card interface device are preferably received from a transit data server at the end of the day. The TDS systems are communications concentrators, used to connect a cluster of fare gate or other card interface devices to the central system. These transactions are different from other fare collection transactions because they have not been "prepaid" to transit operators during the loading process. The electronic cash, such as VISA Cash, used to pay for the fare are held by the transit operator, and a movement of the funds must be made to the transit operator by the TCS system operator, such as a bank, as the electronic cash acquirer.

To transfer funds to the transit operator, data relating to these electronic purse transactions are preferably sent 125 daily by the TCS system to a financial services institution. The financial service institution's clearing and administration system delivers the funds to the TCS system operator 130, as merchant acquirer, by collecting their value from the VISA Cash issuer. The funds received from the financial service institution's clearing and administration system are credited 135 to the transit operator. The TCS system operator preferably monitors that funds are credited to the transit operator, and performs the associated reconcilement activities.

Another transaction shown in the embodiment of a method of the present invention depicted in FIG. 4 relates to the loading of transit products. Loading of transit products refers to the purchase of transit products by a transit rider. Each purchase of a transit product by a transit rider is a "transit load" activity. These can occur at transit operator premises or at third-party merchants (e.g., convenience stores located near the transit operator). Loading can be funded by a debit or a credit card, by an electronic purse such as VISA Cash, or by cash.

Loading transactions are transmitted to the TCS system on-line, preferably as they occur, by the various load devices. Examples of load devices include Add Value Machines (AVMs), which accept cash and cards—credit, debit or another purse, and Electronic Purse Load Machines (EPLMs), which accept only cards, such as cards having an electronic purse. These load devices typically include card interface devices. The load of a transit operator's products can occur at devices located at that transit operator, or at devices located at other transit operators or third-party merchant locations. In the first case, the transaction is considered "on-us" for that transit operator. The payment for the load is received (debit or credit card, or cash) by the TCS system operator and must be turned over to the transit operator. When transit products are loaded at other transit operators or at third-party merchant locations, the transaction is considered "off-us" for the transit operator where the device is located, and payment of funds is to be made to the transit operator offering the product.

In the embodiment shown in FIG. 4, during a loading of a transit product transaction with an electronic purse, data are received from a transit data server 105 based on the interaction between an electronic purse and a card interface device at an electronic purse load machine. The data are preferably received from a transit data server at the electronic purse load machine. The remainder of the clearing and settlement for the loading of a transit product with an electronic purse is handled similarly to the clearing and settlement of funds in a fare collection transaction, discussed above, and involves sending data to a financial services institution 125, receiving funds from the financial services institution's clearing and administration system 130 and crediting the funds received 135 to the appropriate participant.

When transit products are loaded against cash, the TCS system operator preferably collects the proceeds via its revenue-servicing agent. The transit-operator on whose premises the load was performed owes the funds representing the refundable deposit to the TCS system operator. Loads are preferably transmitted on-line to the TCS system by the load devices.

Separately, a manual process may be required to perform a reconcilement of cash collected against the records reported by the load device. A similar process may be followed for loads at third-party merchant locations.

Another transaction shown in the embodiment of a method of the present invention depicted in FIG. 4 relates to card issuance transactions. Transit cardholders preferably obtain a card against the payment of a refundable deposit. As shown in FIG. 4, data are received 110 relating to at least one issuance of a transit card and at least one collection of a refundable deposit. Card issuance can occur at transit operator premises or at third-party merchants. The refundable deposit is payable by debit or credit card, check, cash or electronic cash. Debit and credit card funded transactions are transmitted on-line to the TCS system, as they occur, by the card vending machines (CVMs). The card vending machines preferably utilize a card interface device. Cash funded transactions may occur at CVMs equipped with bill accepting devices, or at attended locations as "Over-the-Counter" (OTC) issuance transactions.

When cards are issued at transit operator premises (either OTC or at a CVM) upon payment of cash or a check, the TCS system operator preferably collect the proceeds via its revenue-servicing agent. The transit operator that distributed the card owes the funds representing the refundable deposit to the TCS system operator. This process requires a reconcilement of funds collected against the records in the card management system and a manual posting into the TCS system for the amount due by the individual transit operator. A similar process will be followed for sales at third-party merchant locations.

The refundable deposits are preferably stored in a refundable deposit pool. In one embodiment comprising a single card issuer, the transit card issuer manages the refundable deposit pool. In a multi-issuer environment, where a new card issuer performs its own cardholder service function, the management of its own refundable deposit pool may be performed by the card issuer without any involvement of the TCS system operator.

Under the embodiment shown in FIG. 4, when data are received from any of the possible transactions, including the transactions 100, 105, 110 shown in FIG. 4, the data are organized into groups associated with each of the plurality of participants 115, and data in the groups are summed to determine a total funds due to and from each of the plurality of participants 120. As discussed above, if the transaction involved electronic cash, then data are sent to a financial services institution 125, funds are received from the financial services institution's clearing and administration system 130, and the funds received are credited 135 to the appropriate participant.

Figure 5:
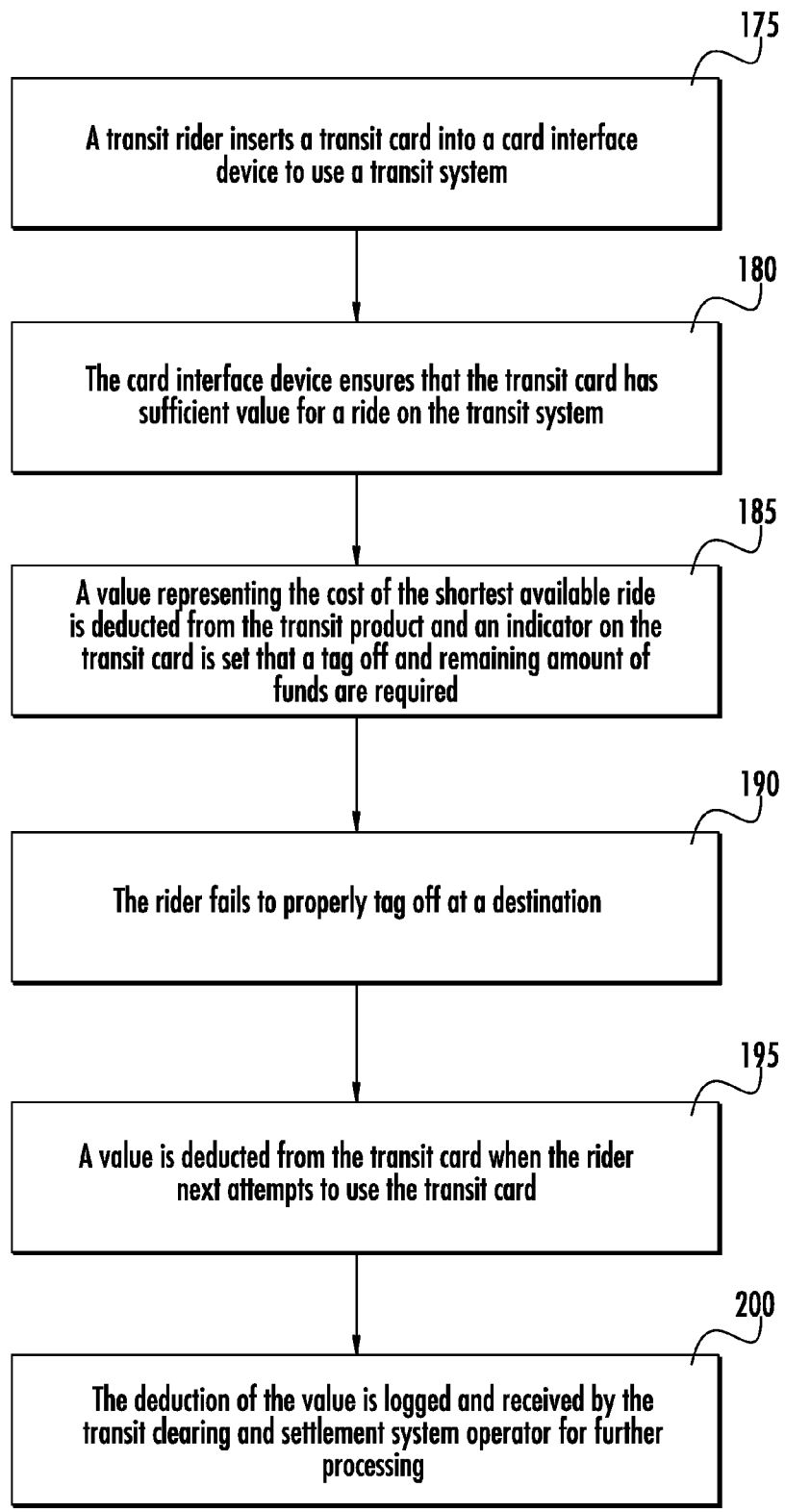
FIG. 5 is a flow chart which illustrates another embodiment of a method of the present invention for clearing and settling funds among a plurality of participants in a transit application that handles failed "tag off" transactions in fare-by-distance and fare-by-zone programs.

The method of the present invention can preferably handle failed "tag off" transactions for transit systems with fare-by-distance or fare-by-zone programs. In fare-by-distance and fare-by-zone programs, the fare to be collected is unknown until the destination is reached and the rider "tags off" on the exit. FIG. 5 is a flow chart which illustrates another embodiment of a method of the present invention for clearing and settling funds among a plurality of participants in a transit application that handles failed "tag off" transactions in fare-by-distance and fare-by-zone programs. The fare-by-distance transaction begins with a transit rider inserting a transit card 175 into a card interface device to board a transit system. The card interface device ensures 180 that the transit card has sufficient value for a ride on the transit system. A value representing the cost of the shortest available ride, is deducted from the transit product and an indicator on the transit card is set 185 that a tag off and remaining amount of funds are required.

When the rider fails to properly tag off 190 at a destination, a value is deducted 195 from the transit card at the rider's next attempt to use the transit card at any transit operator's card interface device. The deduction of the value is logged and received 200 by the transit clearing and settlement operator for further processing in the method for clearing and settlement of funds of the present invention. For example, the data representing the deduction of value for the failed tag off may be used in the embodiment of the present invention set forth in FIG. 1. Depending on the specific fare structure of the transit operator (i.e., if value is deducted when the rider initially tags on), the value deducted the next time the card is used after a failed tag off is equivalent to the balance due for a maximum fare for the previous ride. After the value is deducted 195 and the deduction is logged 200, the rider continues with the purchase of the current fare or other transaction. The failed tag-off transaction is handled in terms of settlement either as a use of prepaid transit value, or as a fare collection from an electronic purse, as the case may be. However, only the current ride (and not the deduction for the failed tag-off) is used in transaction count tallies.

Figure 6:
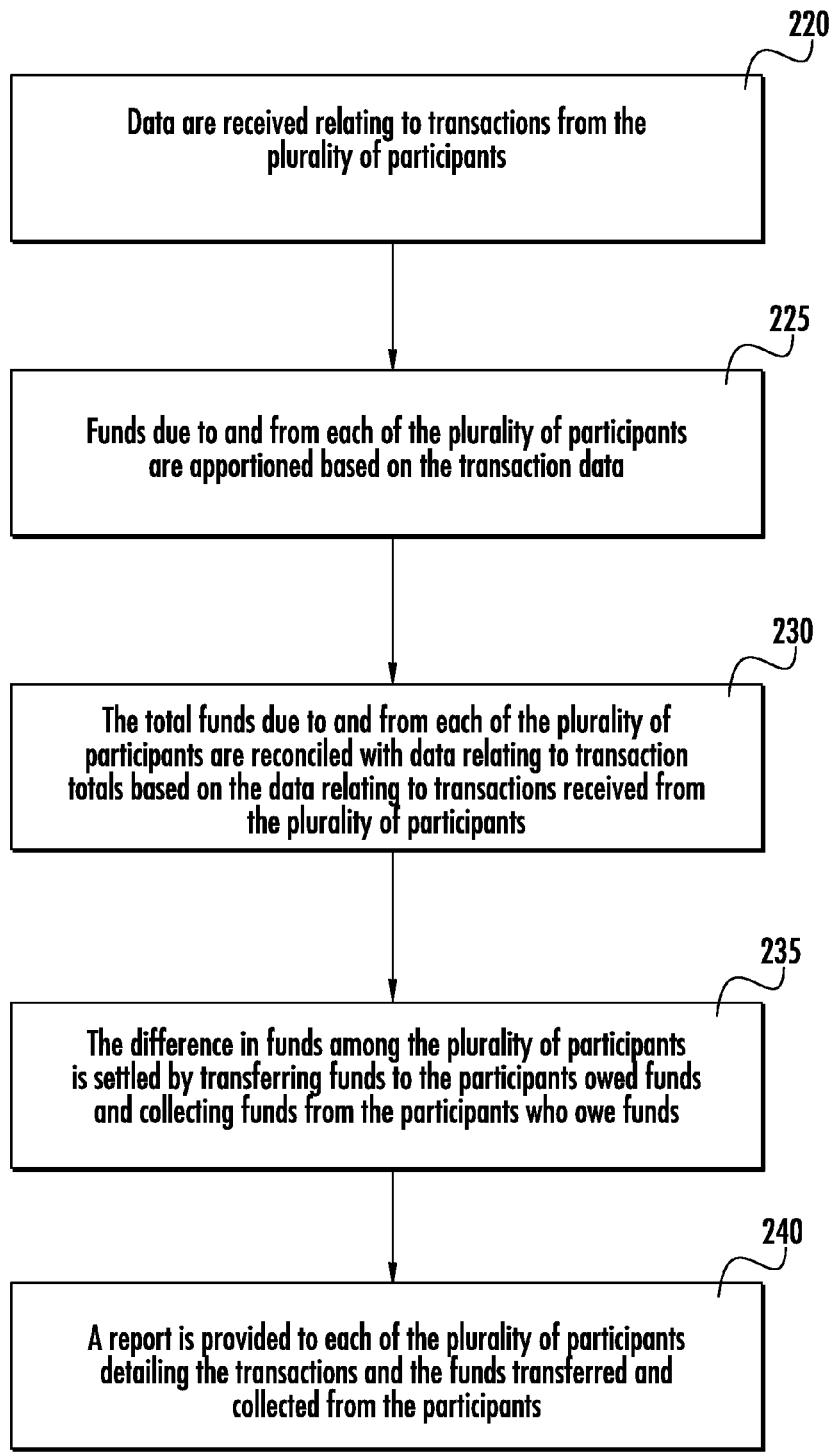
FIG. 6 is a flow chart which illustrates another embodiment of a method of the present invention for clearing and settling funds among a plurality of participants.

FIG. 6 is a flow chart which illustrates another embodiment of a method of the present invention for clearing and settling funds among a plurality of participants. According to this embodiment, data are received relating to transactions 220 from the plurality of participants. This embodiment may also be implemented for use in the transit industry and the plurality of participants may comprise at least one transit operator, at least one card issuer, at least one third party merchant, and at least one transit and clearing system operator, although one TCS system operator is preferred. Accordingly, the data received in this embodiment of the method of the present invention include data relating to any of the transactions discussed in greater detail with respect to FIGS. 1 to 5 above.

The funds due to and from each of the plurality of participants are apportioned 225 based on the transaction data received. As with the embodiment of the present invention discussed in FIG. 2, the total funds due to and from each of the plurality of participants are reconciled 230 with data relating to transaction totals based on the data relating to transactions from the plurality of participants. Likewise, the difference in funds among the plurality of participants is settled 235 by transferring funds to the participants owed funds and collecting funds from the participants owed funds. A report is provided to each of the plurality of participants 240 detailing the transactions and the funds transferred and collected from the participants.

A preferred embodiment further comprises interfacing with an electronic purse system, as discussed with respect to FIG. 3. The features and preferences with regard to the reconciling of the total funds due 230, the settling of the difference among participants 235 and the providing of a report 240 discussed in conjunction with FIG. 2 are equally applicable in this embodiment.

FIG. 7 is a table representation of the process that a transit clearing and settlement system of the present invention uses to arrive at a matrix of the participants' net settlement positions. While the table in FIG. 7 represents a two transit operator system, a person of ordinary skill in the art could readily extend the present invention to a multitude of transit operators. The table includes the type of transaction 260, the source, destination or additional description of the transaction 265 ("From/To"), the movement of funds 270 within the transaction, and additional notes 275 concerning the transaction. The participants shown in FIG. 7 are two transit operators 280, 285, a third party merchant 290, a TCS system operator 295 and a card issue 300.

The entry of "debit" or "credit" in the column below each participant represents the participants' typical settlement position (i.e., participants are owed funds or owe funds) for different transactions in an embodiment of the present invention. Other embodiments of the present invention may result in different net settlement positions for the participants with each transaction. The result of the table is the total settlement (either debit or credit due) for each participant in each transaction, which is netted out to arrive at their net settlement position 305. As noted above with regard to FIG. 2, a reconciliation process is preferably performed to ensure that all system balances agree with the transaction totals, and that the transaction summaries for each transit operator equal the total of all transaction activity for the clearing period.

The present invention also relates to a system for clearing and settling funds among a plurality of participants. A preferred embodiment comprises means for receiving data relating to transactions from the plurality of participants, means for organizing the data into groups associated with each of the plurality of participants, means for summing the data in the groups to determine a total funds due to and from each of the plurality of participants, and means for settling the difference among the plurality of participants by transferring funds to the participants owed funds and collecting funds from the participants who owe funds.

A system of the present invention may further comprise means for interfacing with an open purse settlement system. Another embodiment of the system of the present invention comprises means for reconciling the total funds due to and from each of the plurality of participants. The means for reconciling the total funds due to and from each of the plurality of participants comprise means for comparing the total funds due to and from each of the plurality of participants with data relating to transaction totals based on the data relating to transactions received from the plurality of participants.

The system, in another embodiment may comprise means for providing a report to each of the plurality of participants detailing the transactions and the funds transferred and collected from the participants. In an embodiment of the present invention for the transit industry, the reports may include fare collection details sorted by transit card and fare collection details from at least one open purse system. The reports may further include data relating to transfers, the loading of transit cards and chargebacks.

In another embodiment of the present invention, the participants comprise at least one transit operator and the means for receiving data relating to transactions comprise means for receiving data relating to at least one fare collection transaction. In another embodiment, the participants further comprise an electronic purse system. The means for receiving data relating to at least one fare collection transaction, in an embodiment utilizing an electronic purse system, comprise means for receiving data obtained from an interaction between an electronic purse and a card interface device. In a further embodiment, the means for receiving data obtained from an interaction between an electronic purse and a card interface device comprise means for receiving data from a transit data server.

In another embodiment having an electronic purse system as a participant, the means for settling the difference by transferring funds to the participants owed funds and collecting funds from the participants who owe funds comprise means for sending data relating to at least one fare collection transaction to a financial services institution. The means for settling the difference by transferring funds to the participants owed funds and collecting funds from the participants who owe funds may also comprise means for receiving funds from the financial services institution's clearing and administration system. In a further embodiment, the means for settling the difference include means for crediting the funds received from the financial services institution to a transit operator.

In another embodiment of the system of the present invention, the participants comprise at least one transit operator and the means for receiving data relating to transactions comprises means for receiving data relating to at least one loading of a transit card. In a further embodiment, the transit card is loaded at an add value machine owned by a first transit operator and the transit card was issued by a second transit operator. In another embodiment, the transit card is loaded at an electronic purse load machine.

In another embodiment of the system of the present invention, the participants comprise at least one transit operator and the means for receiving data relating to transactions comprise means for receiving data relating to at least one issuance of a transit card. In a further embodiment, the issuance of a transit card requires payment of a refundable deposit to a card issuer. The refundable deposit may be payable by debit card, by credit card, by check, by cash or by electronic cash. In a still further embodiment, the at least one transit operator sells transit cards and collects refundable deposits using a card vending machine. In an embodiment where the refundable deposit is paid by check or by cash to the at least one transit operator, a system of the present invention further comprises means for collecting the refundable deposit using a revenue-servicing agent.

Figure 8:
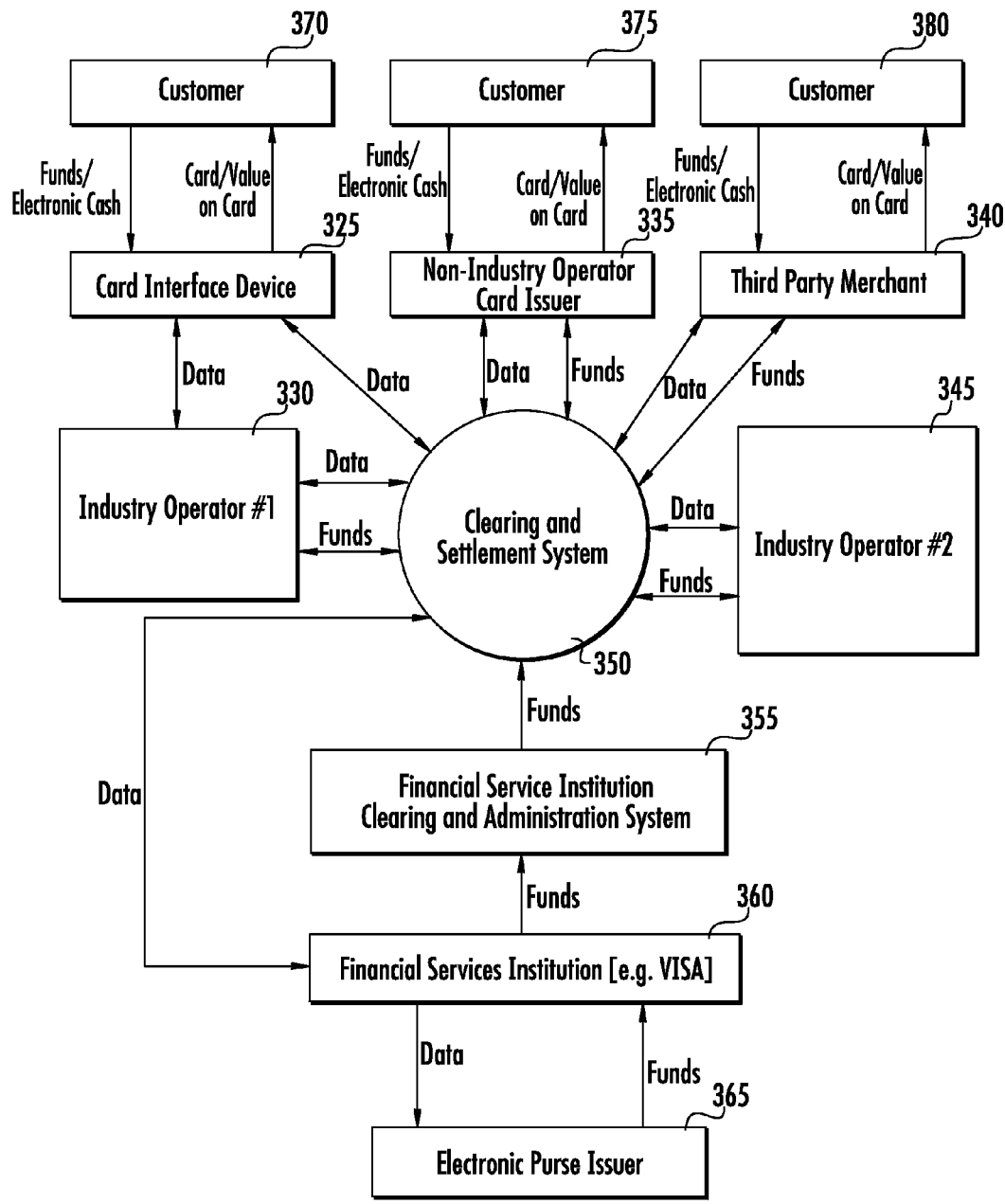
FIG. 8 is a schematic diagram which illustrates an overview of examples of components and participants, and the flow of data and funds between the components and participants, for an embodiment of the present invention for clearing and settling funds among a plurality of participants in the transit industry.
Figure 9:
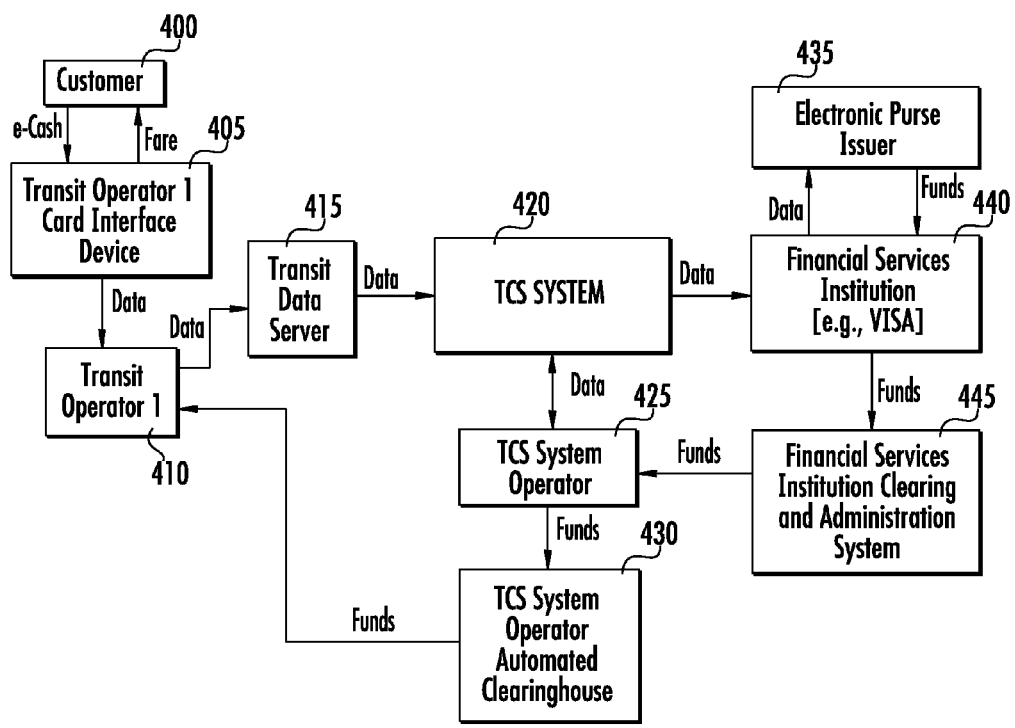
FIG. 9 is a schematic diagram which illustrates an overview of examples of components and participants, and the flow of data and funds between the components and participants, for an embodiment of the present invention for clearing and settling funds for a fare collection transaction involving an electronic purse.
Figure 10:
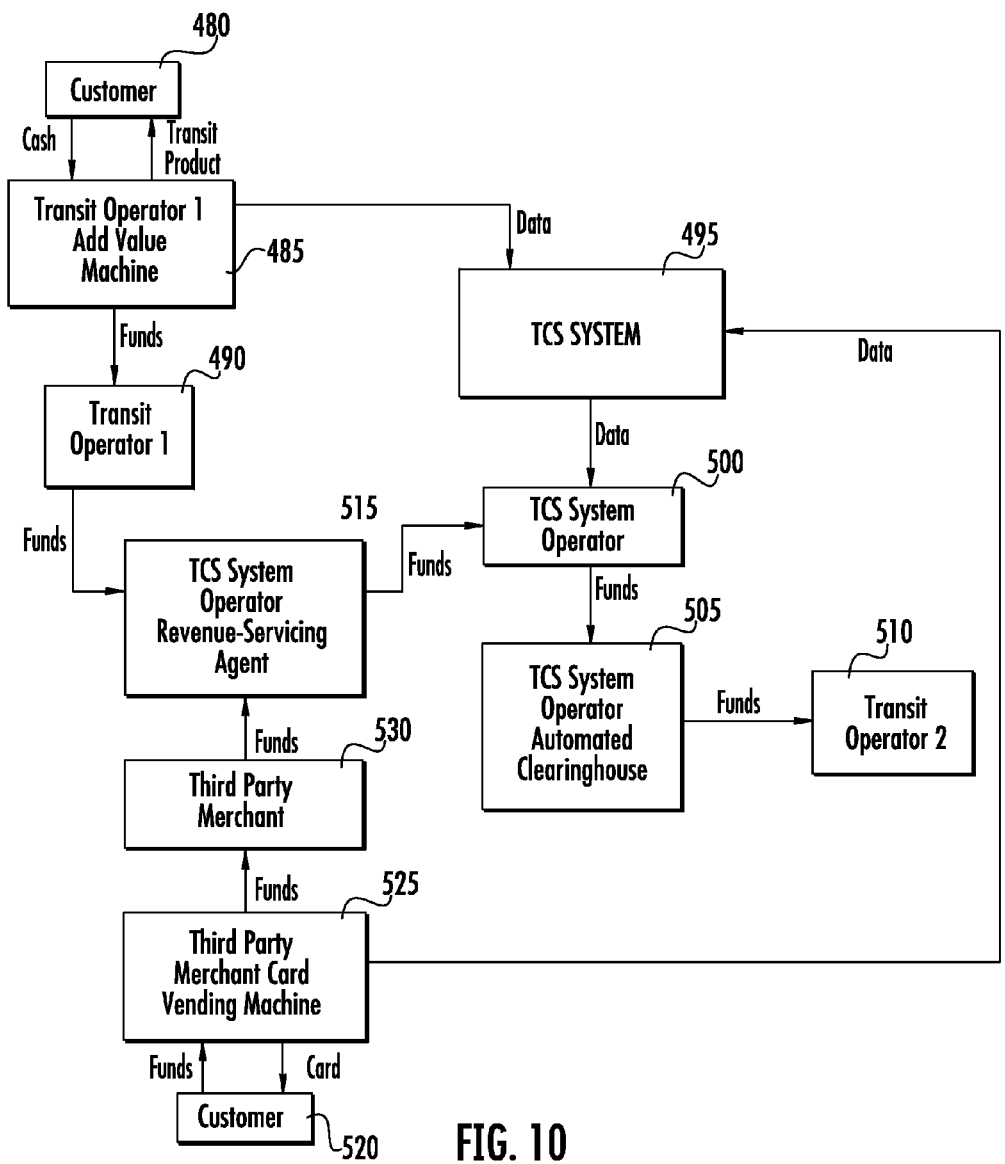
FIG. 10 is a schematic diagram which illustrates an overview of examples of components and participants, and the flow of data and funds between the components and participants, for an embodiment of the present invention for clearing and settling funds for a far collection transaction involving an electronic purse.

FIGS. 8 to 10 illustrate different embodiments of systems of the present invention. FIG. 8 is a schematic diagram which illustrates an overview of examples of components and participants, and the flow of data and funds between the components and participants, for an embodiment of the present invention for clearing and settling funds among a plurality of participants. The participants in the embodiment shown in FIG. 8 comprise two industry operators 330, 345, a non-industry operator card issuer 335, a third party merchant 340 and a clearing and settlement system 350. A card interface device 325 is associated with a first industry operator 330, such that a customer 370 can purchase a card, add value to a card or use the card for a purchase. In a transit example, these transactions may comprise transit card issuance, loading of a transit card or fare collection. For example, when a fare is purchased using a credit card, data relating to the transaction are captured by the card interface device 325 and are received by the clearing and settlement system 350. The card interface device 325 preferably also transfers data to its industry operator 330 relating to the transaction.

A customer 380 may engage in similar transaction with a third party merchant 340. For example, a customer 380 may add value to a transit card by paying electronic cash using an electronic purse to the third party merchant 340. The clearing and settlement system 350 preferably receives data from the third party merchant 340 relating to the loading of the transit card. In another example of a transaction using the system depicted in FIG. 8, a customer 375 purchases a transit card from a non-industry operator card issuer 335, which requires the payment of a refundable deposit. Data relating to the issuance of the transit card and to the collection of the refundable deposit are received by the clearing and settlement system 350 from the card issuer 335. In a preferred embodiment, each of the plurality of participants may receive data from the transit and clearing system. For example, a report may be provided to each of the plurality of participants detailing the transactions and the funds transferred and collected from the participants.

When the transit and clearing system 350 receives data from the participants, the data are organized into groups associated with each of the plurality of participants and are summed to determine a total funds due to and from each of the plurality of participants. To settle the difference by transferring funds to the participants owed funds and collecting funds from the participants who owe funds, the clearing and settlement system may need to collect funds corresponding to electronic purse transactions (e.g., if a fare was purchased or a transit card was loaded using an electronic purse).

In a preferred embodiment, the clearing and settlement system 350 sends data relating to the transactions to a financial services institution 360, such as VISA or MasterCard. The financial services institution 360 may then contact the issuer 365 of the electronic purse for payment of funds corresponding to the electronic cash. The operator of the transit clearing and settlement system 350 then receives funds from the financial service institution's clearing and administration system 355. The operator of the clearing and settlement system 350 credits the funds to the account of a participant (e.g., the first industry operator 330) who is owed funds.

As shown in FIG. 8, the operator of the clearing and settlement system preferably has the ability to collect or credit funds to each of the participants. These settlement transactions preferably take place via on-line transmission or via the operator's revenue-servicing agent. The participants and components of the system present invention preferably comprise computer hardware, data servers and means for communication (e.g., fiber optic cables and T1 lines) between the various participants and components.

FIG. 9 is a schematic diagram which illustrates an overview of examples of components and participants, and the flow of data and funds between the components and participants, for an embodiment of the present invention for clearing and settling funds for a fare collection transaction involving an electronic purse. In this embodiment, which relates to the transit industry, a customer 400 purchases a fare by inserting a card carrying an electronic purse into a transit operator's card interface device 405. Data relating to the fare collection transaction based on the interaction between the electronic purse and the card interface device 405 are preferably received by the transit clearing and settlement (TCS) system 420 from a transit data server 415. Transit data servers are communications concentrators used to connect a cluster of fare gate or other card interface devices to a central system. These transactions are different from other fare collection transactions because they have not been "prepaid" to transit operators during the loading process. The electronic cash, such as VISA Cash, used to pay for the fare are held by the transit operator 410, and a movement of the funds must be made to the transit operator 410 by the TCS system operator 425, such as a bank acting as the electronic cash acquirer.

To transfer funds to the transit operator 410, data relating to these electronic purse transactions are preferably sent daily by the TCS system 420 to a financial services institution 440, such as VISA. The financial services institution 440 requests reimbursement from the electronic purse issuer 435 (e.g., a bank). The issuer 435 then transfers funds to the financial services institution 440. The financial services institution's clearing and administration system 445 delivers the funds to the TCS system operator 420. The funds received from the financial services institution's clearing and administration system 445 are credited to the transit operator 410. The TCS system operator 420 preferably monitors that funds are credited to the transit operator 410 and preferably performs associated reconcilement activities.

FIG. 10 is a schematic diagram which illustrates an overview of examples of components and participants, and the flow of data and funds between the components and participants, for an embodiment of the present invention for clearing and settling funds among a plurality of participants in the transit industry. In one of the transactions shown in FIG. 10, a customer 480 pays cash to an add value machine 485 owned by a first transit operator 490 to load a transit product to a transit card. In this example, where the transit product was purchased at a first transit operator's add value machine 485, the transit product may be for use on a second transit operator's 510 system. When the transit card is loaded at the add value machine 485, data relating to the transaction are sent to the transit clearing and settlement (TCS) system 495. The data relating to the loading transaction are preferably transmitted to the TCS system on-line, preferably as it occurs, by add value machine 485. Because the transit product was not purchased from the transit operator 510 offering the product, payment of funds must be made to the transit operator 510 offering the product. In the example shown, where the transit product was loaded against cash, the TCS system operator 500 preferably collects the proceeds from the first transit operator 490 via its revenue-servicing agent 515. The TCS system operator 500 then transfers the funds to the second transit operator 510 via the TCS system operator automated clearinghouse 505. Separately, a manual process may be required to perform a reconcilement of cash collected against the records reported by the load device.

Another transaction shown in the embodiment depicted in FIG. 10 relates to the issuance of a transit card by a third party merchant. Transit cardholders preferably obtain a card against the payment of a refundable deposit. In the embodiment shown in FIG. 10, a customer 520 obtains a transit card from a third party merchant 530 at a card vending machine 525 by paying a refundable deposit. In one embodiment, the refundable deposit is paid using a debit card or a credit card. Data relating to debit and credit card funded transactions are preferably transmitted on-line to the TCS system 495, as they occur, by the card vending machines (CVMs) 525. The card vending machines preferably utilize a card interface device. Cash or check funded transactions may occur at CVMs equipped with bill accepting devices, or at attended locations as "Over-the-Counter" (OTC) issuance transactions.

When cards are issued at transit operator premises (either OTC or at a CVM) upon payment of cash or a check, the TCS system operator 500 preferably collect the proceeds via its revenue-servicing agent 515. The third party merchant 530 that distributed the card owes the funds representing the refundable deposit to the TCS system operator 500. This process requires a reconcilement of funds collected against the records in the card management system and a manual posting into the TCS system 495 for the amount due by the third party merchant 530. The refundable deposits are preferably stored in a refundable deposit pool.

In a further embodiment of a method and system of the present invention, the clearing process includes only the face value of transactions. Commissions, fees, TCS system processing fees, device usage fees, incremental gateway interchange fees, and other financial network charges associated with transit-related transactions, are processed and reported through daily or monthly billing.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for clearing and settling funds among a plurality of participants, comprising:
   receiving data by a server relating to transactions from the plurality of participants;
   organizing the data by the server into groups associated with each of the plurality of participants;
   summing the data in the groups by the server to determine a total funds due to and from each of the plurality of participants; and
   settling a difference by the server among the plurality of participants by transferring funds to the participants owed funds and collecting funds from the participants who owe funds.

2. The method of claim 1, wherein receiving the data, organizing the data and summing the data are performed daily.

3. The method of claim 2, wherein organizing the data and summing the data are performed on a first day after a day on which the transactions occurred.

4. The method of claim 1, wherein settling the difference by transferring funds to the participants owed funds and collecting funds from the participants who owe funds is performed on a second banking day after a day on which the transactions occurred.

5. The method of claim 1, further comprising interfacing with an open purse settlement system.

6. The method of claim 5, wherein receiving data relating to transactions comprises receiving data obtained from an interaction between an electronic purse and a card interface device.

7. The method of claim 6, wherein receiving data obtained from an interaction between an electronic purse and a card interface device comprises receiving data from a data server.

8. The method of claim 5, wherein settling the difference by transferring funds to the participants owed funds and collecting funds from the participants who owe funds comprises sending data relating to transactions to a financial services institution.

9. The method of claim 5, wherein settling the difference by transferring funds to the participants owed funds and collecting funds from the participants who owe funds comprises receiving funds from a financial services institution's clearing and administration system.

10. The method of claim 9, wherein settling the difference by transferring funds to the participants owed funds and collecting funds from the participants who owe funds comprises crediting the funds received from the financial services institution to one of the participants.

11. The method of claim 1, wherein receiving data comprises receiving data relating to transactions from at least one transit operator.

12. The method of claim 1, wherein receiving data comprises receiving data relating to transactions from at least one card issuer.

13. The method of claim 1, wherein receiving data comprises receiving data relating to transactions from at least one third party merchant.

14. The method of claim 1, wherein receiving data comprises receiving data relating to transactions from at least one transit operator, at least one card issuer and at least one third party merchant.

15. The method of claim 1, wherein the participants comprise at least one transit operator and receiving data relating to transactions comprises receiving data relating to at least one fare collection transaction.

16. The method of claim 15, wherein receiving data relating to at least one fare collection transaction comprises receiving data obtained from an interaction between a transit card and a card interface device.

17. The method of claim 16, wherein the transit card is issued by a first transit operator and the card interface device is owned by the first transit operator.

18. The method of claim 16, wherein the transit card is issued by a first transit operator and the card interface is owned by a second transit operator.

19. The method of claim 16, wherein receiving data obtained from the interaction between the transit card and the card interface device comprises receiving data obtained from the interaction between the transit card and the card interface device when a fare is purchased.

20. The method of claim 16, wherein receiving data obtained from the interaction between the transit card and the card interface device comprises receiving data obtained from the interaction between the transit card and the card interface device when a fare on the transit card is used.

21. The method of claim 15, wherein the participants further comprise an electronic purse system.

22. The method of claim 21, wherein receiving data relating to loading of at least one transit card at an electronic purse load machine comprises receiving data obtained from an interaction between an electronic purse and a card interface device.

23. The method of claim 22, wherein receiving data obtained from an interaction between an electronic purse and a card interface device comprises receiving data from a transit data server.

24. The method of claim 21, wherein settling the difference by transferring funds to the participants owed funds and collecting funds from the participants who owe funds comprises sending data relating to at least one fare collection transaction to a financial services institution.

25. The method of claim 24, wherein settling the difference by transferring funds to the participants owed funds and collecting funds from the participants who owe funds comprises receiving funds from the financial services institution's clearing and administration system.

26. The method of claim 25, wherein settling the difference by transferring funds to the participants owed funds and collecting funds from the participants who owe funds comprises crediting the funds received from the financial services institution to a transit operator.

27. The method of claim 1, wherein the participants comprise at least one transit operator and receiving data relating to transactions comprises receiving data relating to at least one loading of a transit card.

28. The method of claim 27, wherein the transit card is loaded at an add value machine owned by a first transit operator and the transit card was issued by a second transit operator.

29. The method of claim 28, wherein receiving data relating to at least one loading of a transit card further comprises receiving data from the add value machine relating to at least one loading of a transit card.

30. The method of claim 27, wherein the transit card is loaded at an electronic purse load machine.

31. The method of claim 30, wherein receiving data relating to at least one loading of a transit card further comprises receiving data from the electronic purse load machine relating to at least one loading of a transit card.

32. The method of claim 1, wherein the participants comprise at least one transit operator and receiving data relating to transactions comprises receiving data relating to at least one issuance of a transit card.

33. The method of claim 32, wherein the issuance of a transit card requires payment of a refundable deposit to a card issuer.

34. The method of claim 33, wherein the refundable deposit is payable by one of a debit card, a credit card, a check, cash or electronic cash.

35. The method of claim 34, wherein the at least one transit operator sells transit cards and collects refundable deposits using a card vending machine.

36. The method of claim 35, wherein receiving data relating to at least one issuance of a transit card comprises receiving data from the card vending machine relating to the payment of the refundable deposit.

37. The method of claim 36, wherein receiving data from a card vending machine relating to the payment of the refundable deposit comprises receiving data from the card vending machine relating to the payment of the refundable deposit upon issuance of the card when the refundable deposit is paid by one of a debit card or credit card.

38. The method of claim 35, further comprising collecting the refundable deposit using a revenue-servicing agent when the refundable deposit is paid by one of a check or cash to the at least one transit operator.

39. The method of claim 1, wherein settling the difference comprises settling the difference by transferring funds to the participants owed funds and collecting funds from the participants who owe funds on a net settlement basis.

40. The method of claim 1, wherein settling the difference comprises settling the difference by transferring funds to the participants owed funds and collecting funds from the participants who owe funds on a gross settlement basis.

41. The method of claim 1, wherein settling the difference comprises guaranteeing the settlement of obligations of at least one third party merchant.

42. The method of claim 41, wherein guaranteeing the settlement comprises issuing a line of credit to the at least one third party merchant.

43. The method of claim 41, wherein guaranteeing the settlement comprises depositing collateral in an account.

44. The method of claim 1, wherein settling the difference by transferring funds to the participants owed funds comprises settling the difference by crediting funds to the participants owed funds through an automated clearinghouse.

45. The method of claim 1, wherein settling the difference by collecting funds from the participants who owe funds comprises receiving payments from the participants who owe funds through a revenue servicing agent.

46. The method of claim 45, wherein the transactions are a cash-based card issuance or a cash-based card load.

47. The method of claim 46, wherein the participants comprise at least one transit operator and at least one third party merchant.

48. The method of claim 1, further comprising reconciling the total funds due to and from each of the plurality of participants.

49. The method of claim 48, wherein reconciling the total funds due to and from each of the plurality of participants comprises comparing the total funds due to and from each of the plurality of participants with data relating to transaction totals based on the data relating to transactions received from the plurality of participants.

50. The method of claim 1, further comprising providing a report to each of the plurality of participants detailing the transactions and the funds transferred and collected from the participants.

51. The method of claim 50, wherein the reports comprise fare collection details sorted by transit card and fare collection details from at least one open purse system.

52. The method of claim 51, wherein the reports further comprise data relating to transfers, the loading of transit cards and chargebacks.

53. The method of claim 1, wherein the participants comprise at least one transit operator utilizing a fare-by-distance or fare-by-zone program.

54. The method of claim 53, further comprising ensuring that a transit rider has sufficient value on a transit card for a ride, deducting from the transit card a value representing a shortest available ride and setting an indicator on the transit card that a tag-off and remaining amount of funds are required.

55. The method of claim 54, wherein the ensuring, deducting and setting are performed by a card interface device.

56. The method of claim 53, further comprising deducting value from the transit card when the rider fails to properly tag off at a destination.

57. The method of claim 56, wherein deducting value comprises deducting value from the transit card when the rider next attempts to use the transit card.

58. The method of claim 57, further comprising logging the deduction of value for later processing and continuing with the current fare payment.

59. The method of claim 1, further comprising processing refunds to qualifying customers.

60. The method of claim 59, wherein qualifying customers comprise customers whose cards were lost, stolen or defective.

61. The method of claim 1, further comprising handling failed card load transactions.

* * * * *